UNITED STATES PATENT OFFICE.

FREDERIC KUHLMANN, OF PARIS, FRANCE.

IMPROVEMENT IN METHODS OF VARNISHING AND PROTECTING SURFACES.

Specification forming part of Letters Patent No. 22,878, dated February 8, 1859.

*To all whom it may concern:*

Be it known that I, FREDERIC KUHLMANN, of Paris, in the Empire of France, have invented certain new and useful Improvements Applicable to Painting, Varnishing, and Printing, and to the Finishing of Different Fabrics and other Surfaces; and I do hereby declare that the following is a full, clear, and exact description of the same.

My invention relates to a new and improved process for painting, printing, and dressing on walls or fibrous and textile surfaces, &c.

In my former patent, dated August 12, 1856, I have mentioned the application of artificial sulphate of baryta. It is particularly in the paste-painting or paste-colors that I have usefully employed this basis, which I have found to be also a useful application in silicious paintings, considering its low price, its great whiteness, and the luster it may have imparted to it. In order to obtain this sulphate of baryta, I use the chloride of manganese, (ClMn,) the residue of the manufacture of chlorine, and of the discoloring chlorides. I saturate the excess of acid contained in the liquid residue by means of the native carbonate of baryta. When the saturation is obtained I strain the above liquid into a kiln or furnace similar to that used in the manufacture of soda, and into said kiln or furnace I introduce (together with the liquid) pulverized coal and native sulphate of baryta. ($SO^3BaO$.) The proportions I deem most suitable to use are the following: first, three hundred and fifty to three hundred and eighty parts, by weight, of the above saturated liquid, containing from eighty to eighty-five parts of dried chloride of manganese; second, one hundred parts of pulverized sulphate of baryta, ($SO^3BaO$;) third, thirty parts of pulverized coal.

When all the above-named substances have been put into the kiln I heat the latter to a high temperature by means of blowers acting on the fire-place, and after about two or three hours of heating and mixing the substances it is found that sulphide of manganese, sulphide and peroxide of iron, and chloride of barium are produced. The water resulting from the washing of the three latter substances mixed together contains all the soluble chloride of barium. In this water I pour sulphuric acid till the precipitation of the sulphate of baryta ceases—that is, till it cannot take place any longer. The precipitate of sulphate of baryta is decanted, after resting, and the remaining liquid contains chlorhydric acid, for which useful applications may be found. The decanted precipitate is washed with water, preferably hot, till it contains no trace of chlorhydric acid. It is then put into very close flax bags and submitted in this state to the action of rotary drying machinery, after which it is ready for use in painting. When it is desired to obtain the same very dry it may be submitted to the same drying process as that employed in the manufacture of white lead. The substance thus prepared possesses one very valuable property: It enters into intimate combination with the soluble alkaline silicates, which combination is effected very gradually, and the compound thus produced has a luster and fixity very superior to ordinary white paints; and this combination may be made the means of introducing and fixing other colors than white. Thus by combining the sulphate of baryta with the desired color and laying it on the surface to be painted, then washing or painting over this with a solution of an alkaline silicate, a durable surface is produced, possessing remarkable luster.

The manner of using this paint basis has been already described in the Letters Patent alluded to, and therefore I confine myself here to a description of the methods of fixing and finishing off the surface of the painting after it has been executed.

*Fixing the colors.*—Having described the process by which I obtain my white basis, I will now proceed to describe the nature of the liquids which serve to fix the same basis alone, or when other colors have been added to it. For this purpose I use chiefly solutions of glue or of gelatine, (used for fixing other colors;) but the following processes will also render the colors water-proof when prepared with my basis. This result or quality is contrary to the nature of all colors hitherto used, which are easily washed off by the action of water. The two processes I use for obtaining this result are as follows:

First. When my paint has been applied on the wall or other surface I repaint on it—that is, I spread over it—a new coating composed of a solution of silicate of potash or soda heated to a temperature of from 4° to 6° Baumé. A stronger solution would not permit uniform colors to be obtained.

Second. When my paint has been applied on the wall or other surface I repaint on it a new coating composed of decoction of gall-nut, sumac, or other tannic matters, which transforms the gelatine or glue (with which the colors have been mixed) into an artificial leather and renders the colors water-proof. If more concentrated decoctions are used, they will form a varnished coating on the painted surface and render the same completely waterproof.

For an economical purpose I may substitute fecula or starch for the glue or gelatine. In this case I dilute my colors in the starch or fecula when these latter are in the state of hot paste. The colors are then ready for use, and in order to fix them I repaint with a very liquid cream of lime or baryta diluted in water. Then the starch or fecula forms, in conjunction with the lime or baryta, a water-proof composition. The fixing may also be effected by solutions of alkaline silicates and tannin mixed together.

Previous to the water-proofing my colors can be polished. The white color thus treated will receive a very brilliant white polish. In using my colors, as is done with others to render their application more easy, it is proper to apply them when the paste, glue, or gelatine is slightly hot.

My improved colors are suitable for painting on wood, stone, paper, pasteboard, metal, and other surfaces.

*Printing.*—My process is also very suitable for rendering printed papers and fabrics waterproof. For this purpose I produce the different colors or tints by well-known means; and when the print is very dry I wet down or submerge the surface in a bath containing a weak solution of gall-nut or other tannic matter, in order to not alter the ground or inner margin of the printed surface. For fixing the colors when they have been diluted in starch or fecula I use cream of lime.

*Finishing and coating.*—I apply my process of producing a coating of varnish or artificial leather for the purpose of varnishing and waterproofing wood, paper, papier-maché, pasteboard, engravings, photographic drawings, and all kinds of surfaces, and also for finishing and rendering water-proof the papers, fabrics, and other materials. For that purpose I coat the above surfaces with a coating of gelatine, and subsequently with another coating of tannic matters. In the case of finishing papers, fabrics, and other materials, I complete the operation by a hot-calendering.

I also coat by my process all plaster surfaces with the varnish or artificial leather for the purpose of rendering said surfaces waterproof and preserving them. I can also use for the same purpose the following process: I submerge the plaster surface many times in a water of baryta, exposing said surface to the action of air between or after each of these immersions. By these immersions there is produced (on and in the interior of the surface) insoluble sulphate of baryta, and the lime is set free. In the exposure to the action of the air the said lime becomes insoluble carbonate of lime.

Having thus described the various methods invented by me for preserving the surfaces of paintings, the basis of which consists, in whole or in part, of artificial sulphate of baryta made as described, I claim—

1. The process herein described of fixing the surfaces of fabrics (fibrous or textile) or solid surfaces— as walls or masonry—by the application of a weak solution of an alkaline silicate—as the silicate of potash and soda—to said paint basis.

2. For a similar purpose, the method herein described of laying a coating of artificial leather, produced as set forth, over the surface of the basis pigment.

3. The within-described method of fixing, rendering printed papers and fabrics waterproof, and fixing the same by hot-calendering.

4. The within-described method of rendering the surface of plaster-of-paris water-proof and of preserving the same by forming a coating of artificial sulphate of baryta upon said surface.

FRED. KUHLMANN.

Witnesses:
GARDISSAL,
GEO. HUTTON.